(12) United States Patent
Chaouki et al.

(10) Patent No.: US 9,919,975 B2
(45) Date of Patent: Mar. 20, 2018

(54) POROUS SIC CERAMIC AND METHOD FOR THE FABRICATION THEREOF

(75) Inventors: Jamal Chaouki, Dorval (CA); Omid Ebrahimpour, Montreal (CA); Charles Dubois, Brossard (CA)

(73) Assignee: POLYVALOR, LIMITED PARTNERSHIP, Montreal (CA)

( * ) Notice: Subject to any disclaimer, the term of this patent is extended or adjusted under 35 U.S.C. 154(b) by 192 days.

(21) Appl. No.: 14/240,543

(22) PCT Filed: Aug. 24, 2012

(86) PCT No.: PCT/CA2012/050586
§ 371 (c)(1),
(2), (4) Date: Feb. 24, 2014

(87) PCT Pub. No.: WO2013/026168
PCT Pub. Date: Feb. 28, 2013

(65) Prior Publication Data
US 2014/0206525 A1    Jul. 24, 2014

Related U.S. Application Data

(60) Provisional application No. 61/526,849, filed on Aug. 24, 2011.

(51) Int. Cl.
*C04B 35/565*   (2006.01)
*C04B 38/06*    (2006.01)
(Continued)

(52) U.S. Cl.
CPC .......... *C04B 38/067* (2013.01); *C04B 35/565* (2013.01); *C04B 35/6265* (2013.01);
(Continued)

(58) Field of Classification Search
CPC ............... C04B 14/324; C04B 35/565; C04B 35/6265; C04B 38/06; C04B 38/0045
(Continued)

(56) References Cited

U.S. PATENT DOCUMENTS 5,080,378 A * 1/1992 Kagawa ..................... 277/404
5,610,110 A * 3/1997 Azema et al. ................ 501/88
(Continued)

FOREIGN PATENT DOCUMENTS

| CA | 2121864 A1 | 11/1994 |
| EP | 1541538 A1 | 6/2005 |

OTHER PUBLICATIONS

International Search Report issued in PCT/CA2012/050586 on Nov. 23, 2012.
(Continued)

*Primary Examiner* — Erin Snelting
(74) *Attorney, Agent, or Firm* — Beatrice Ngatcha

(57) ABSTRACT

There is provided a method for the fabrication of porous SiC ceramic. The method comprises oxidizing particles of SiC ceramic thereby forming amorphous silica on the surface of the particles. The oxidized SiC particles are then mixed with an additive. Alternatively, layer(s) of the additive is (are) deposited on their surface by sol-gel technique. The oxidized SiC particles mixed or coated with the additive are then mixed with at least one pore-former. Alternatively, the oxidized SiC particles mixed or coated with the additive are coated with layer(s) of a polymer or pore-former by in-situ polymerization. In embodiments where the oxidized SiC particles are mixed with an additive and a pore-former or polymer, a further additive may be used. In each of these embodiments, the resulting product is then compacted into a green body which is heated and sintered to yield the porous
(Continued)

Schematic of final coated SiC particles.

SiC ceramic material. There is also provided a porous SiC ceramic fabricated by the method according to the invention.

20 Claims, 18 Drawing Sheets

(51) Int. Cl.
<table>
<tr><td>C04B 35/626</td><td>(2006.01)</td></tr>
<tr><td>C04B 35/628</td><td>(2006.01)</td></tr>
<tr><td>C04B 35/63</td><td>(2006.01)</td></tr>
<tr><td>C04B 35/634</td><td>(2006.01)</td></tr>
<tr><td>C04B 38/00</td><td>(2006.01)</td></tr>
<tr><td>C04B 111/00</td><td>(2006.01)</td></tr>
</table>

(52) U.S. Cl.
CPC .. *C04B 35/62655* (2013.01); *C04B 35/62802* (2013.01); *C04B 35/62807* (2013.01); *C04B 35/62813* (2013.01); *C04B 35/62886* (2013.01); *C04B 35/62894* (2013.01); *C04B 35/62897* (2013.01); *C04B 35/6303* (2013.01); *C04B 35/6342* (2013.01); *C04B 35/63408* (2013.01); *C04B 35/63416* (2013.01); *C04B 35/63424* (2013.01); *C04B 38/0006* (2013.01); *C04B 38/0045* (2013.01); *C04B 38/0054* (2013.01); *C04B 38/06* (2013.01); *C04B 2111/0081* (2013.01); *C04B 2111/00793* (2013.01); *C04B 2235/3206* (2013.01); *C04B 2235/3217* (2013.01); *C04B 2235/3225* (2013.01); *C04B 2235/3229* (2013.01); *C04B 2235/3463* (2013.01); *C04B 2235/3481* (2013.01); *C04B 2235/383* (2013.01); *C04B 2235/5409* (2013.01); *C04B 2235/5436* (2013.01); *C04B 2235/604* (2013.01); *C04B 2235/6562* (2013.01); *C04B 2235/6565* (2013.01); *C04B 2235/661* (2013.01); *C04B 2235/96* (2013.01)

(58) Field of Classification Search
USPC ......................................................... 264/682
See application file for complete search history.

(56) References Cited

U.S. PATENT DOCUMENTS

<table>
<tr><td>5,945,062 A *</td><td>8/1999</td><td>Chwastiak et al. ........... 264/640</td></tr>
<tr><td>6,030,564 A *</td><td>2/2000</td><td>Whitman ....................... 264/109</td></tr>
<tr><td>6,214,078 B1</td><td>4/2001</td><td>Way et al.</td></tr>
<tr><td>6,562,745 B2 *</td><td>5/2003</td><td>Willkens et al. ............... 501/88</td></tr>
<tr><td>7,670,979 B2</td><td>3/2010</td><td>Quadir et al.</td></tr>
<tr><td>8,158,248 B2 *</td><td>4/2012</td><td>Hara et al. ................. 428/314.2</td></tr>
<tr><td>8,986,598 B2 *</td><td>3/2015</td><td>Kim et al. ..................... 264/621</td></tr>
<tr><td>2003/0107146 A1 *</td><td>6/2003</td><td>Hosoe et al. .................... 264/81</td></tr>
<tr><td>2006/0121239 A1 *</td><td>6/2006</td><td>Furukawa et al. ............. 428/116</td></tr>
<tr><td>2008/0093779 A1 *</td><td>4/2008</td><td>Cutler et al. .................. 264/682</td></tr>
<tr><td>2009/0214850 A1 *</td><td>8/2009</td><td>Hara et al. ................. 428/314.2</td></tr>
<tr><td>2010/0071328 A1</td><td>3/2010</td><td>Boussant-Roux et al.</td></tr>
</table>

OTHER PUBLICATIONS

Alvin M. A. "Advances Ceramic Materials for Use in High-Temperature Particulate Removal Systems" Ind. Eng. Chem. Res. 1996, 35, 3384-3398.

Al-Yassir N. and Le Van Mao R. "Thermal stability of alumina aerogel doped with yttrium oxide, used as a catalyst support for the thermocatalytic cracking (TCC) process: An investigation of its textural and structural properties" Applied Catalysis A: General 2007, 317, 275-283.

Ding S. et al. "Effect of Y2O3 addition on the properties of reaction-bonded porous SiC ceramics" Ceramics International 2006, 32, 461-466.

Ding S. et al. "In situ reaction bonding of porous SiC ceramics", Materials Characterization, 2008, 59, 140-143.

Ding S. et al. "Fabrication of Mullite-Bonded Porous Silicon Carbide Ceramics by In-Situ Reaction Bonding" Journal of the European Ceramic Society 2007, 27, 2095-2102.

Liu S. et al. "Effects of CeO2 addition on the properties of cordierite-bonded porous SiC ceramics" Journal of the European Ceramic Society 2009, 29, 195-1802.

Liu S. et al. "Fabrication and characterization of cordierite-bonded porous SiC ceramics" Ceramics International 2009, 35, 597-602.

Naskar M. K. and Chatterjee M. "A novel process for the synthesis of cordierite (Mg2Al4Si5O18) powders from rice husk ash and other sources of silica and their comparative study" Journal of the European Ceramic Society 2004, 24, 3499-3508.

She J. H. et al. "Oxidation Bonding of Porous Silicon Carbide Ceramics" Journal of Material Science 2002, 37, 3615-3622.

Yoldas, B.E. "Alumina Sol Preparation from Alkoxides" Ceramic Bulletin 1975, vol. 54, No. 3, pp. 289-290.

Zhang S. et al. "Preparation and corrosion resistance studies of nanometric sol-gel-based CeO2 film with a chromium-free pretreatment on AZ91D magnesium alloy" Electrochimica Acta 2010, 55, 870-877.

Kaiser, A. et al. "Uniaxial hydraulic pressing as shaping technology for advanced ceramic products of larger size" Interceram 2011, 03-04, 230-234.

* cited by examiner

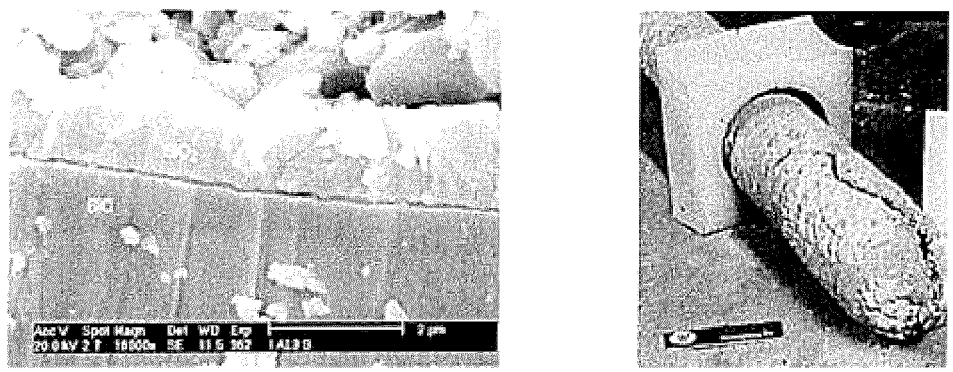
Figure 1. Crystallization of the Schumacher Dia Schumalith F40 filters matrix during operation (M. A. Alvin 1996) [1]
PRIOR ART

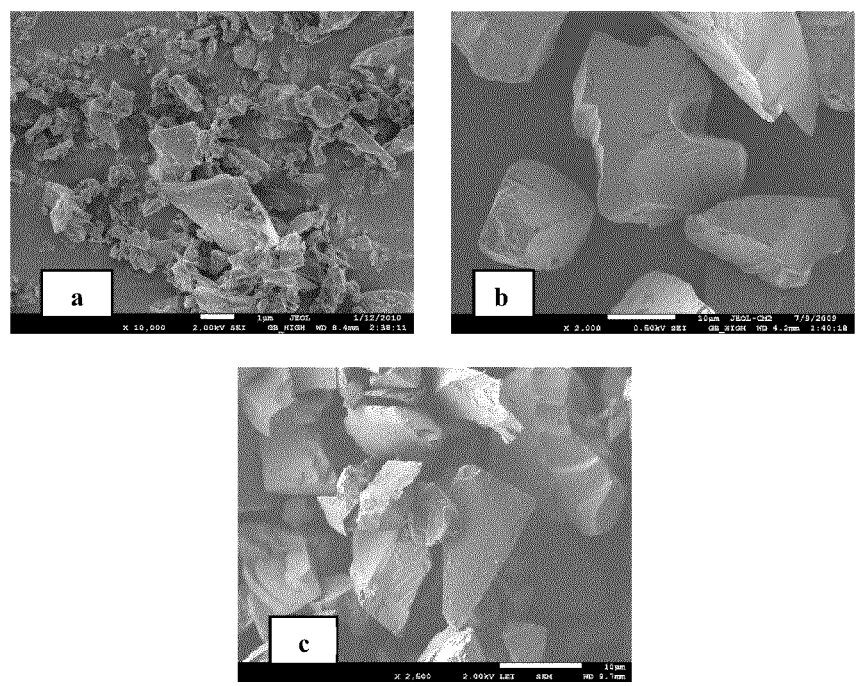
Figure 2. SEM images of raw SiC: (a) α-SiC 1.7μm; (b) α-SiC 22.1μm; (c) α-SiC 12.1 μm.

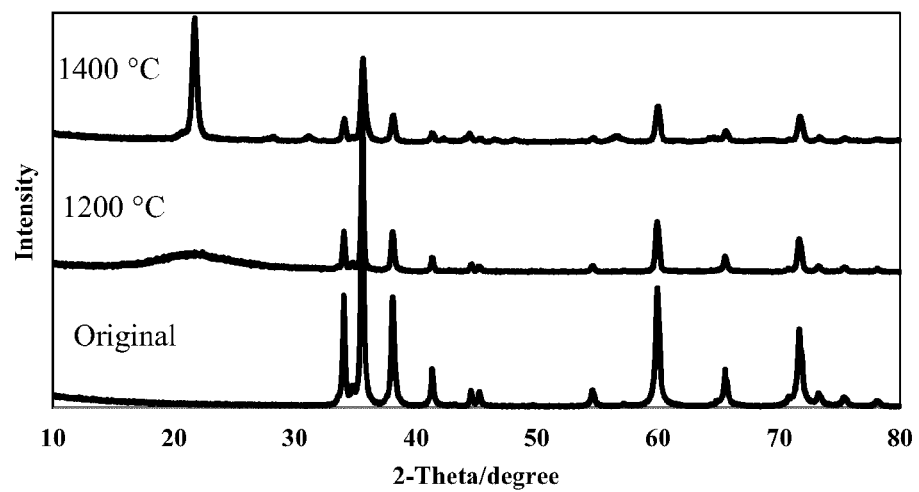
Figure 3. XRD patterns of the original α-SiC 1.7 μm powder (a) and after oxidation at various temperatures: (b) 1200°C and (c) 1400°C for 4 hours in air (S is SiC and C is cristobalite).

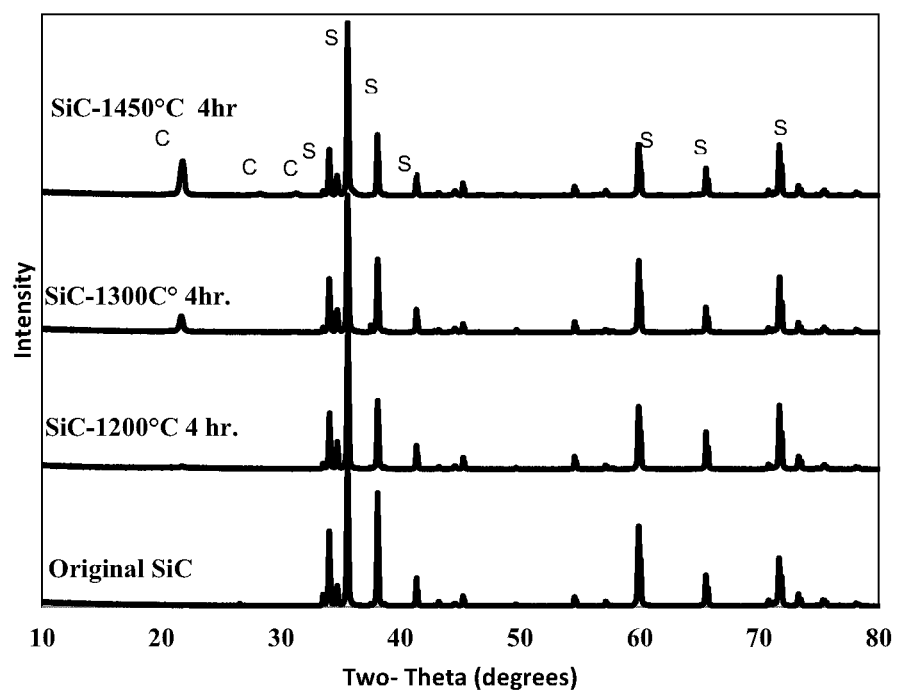
Figure 4. XRD patterns of the original α-SiC 22.1 μm powder, and after oxidation at various temperatures in air.

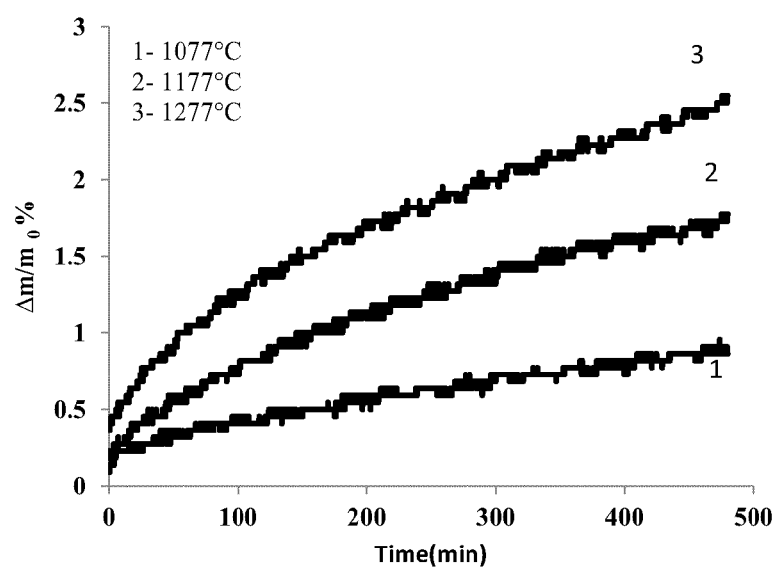
Figure 5. Relative mass changes of α-SiC (22.1 μm) against oxidation time (8 hours).

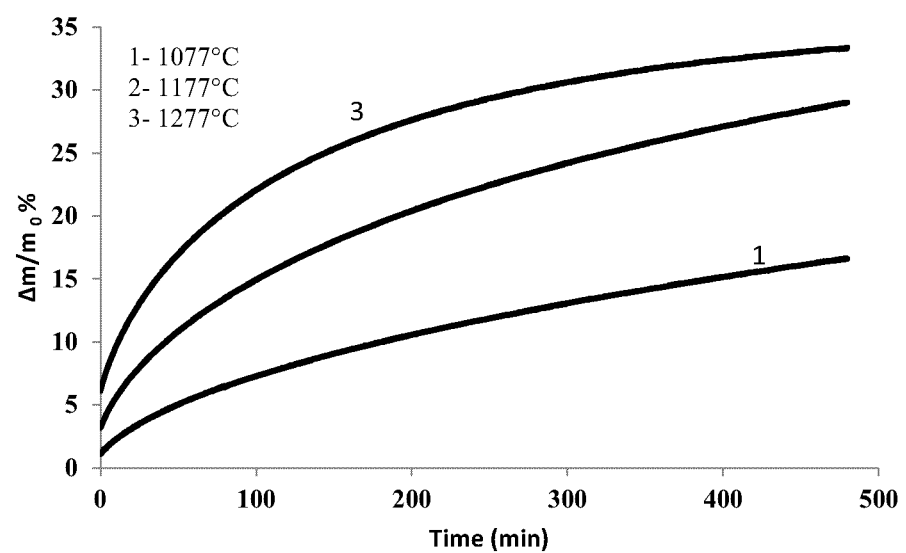
Figure 6. Relative mass changes of α-SiC 1.7μm against oxidation time (8 hours).

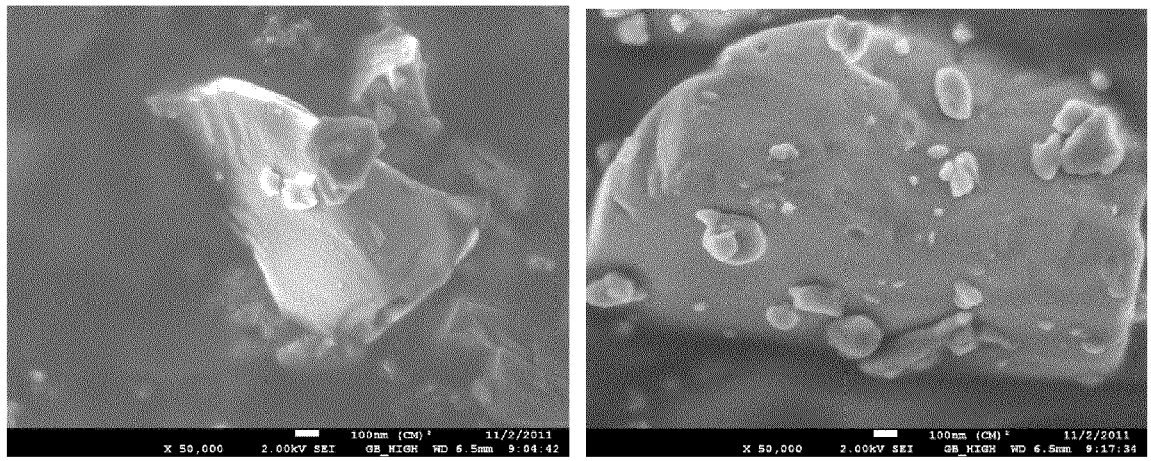
Figure 7. SEM micrograph of α- SiC 1.7 μm before and after oxidation at 1200 °C for 5 hours in air.

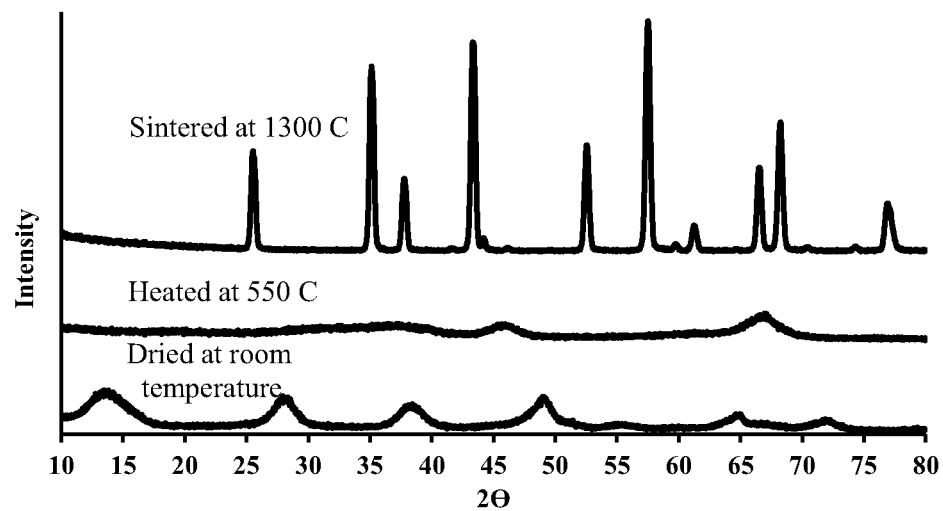
Figure 8. X-ray diffraction patterns for dried alumina sol and after heat treatment.

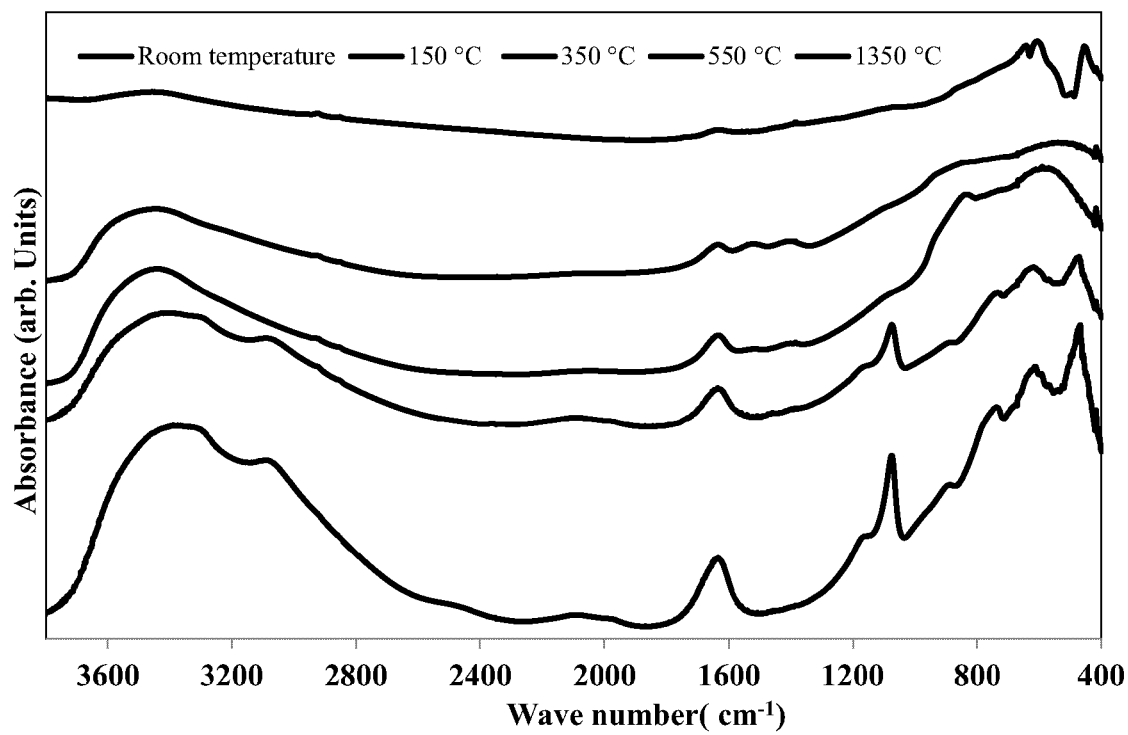
Figure 9. FTIR spectra obtained for the dried and heat treated boehmite samples.

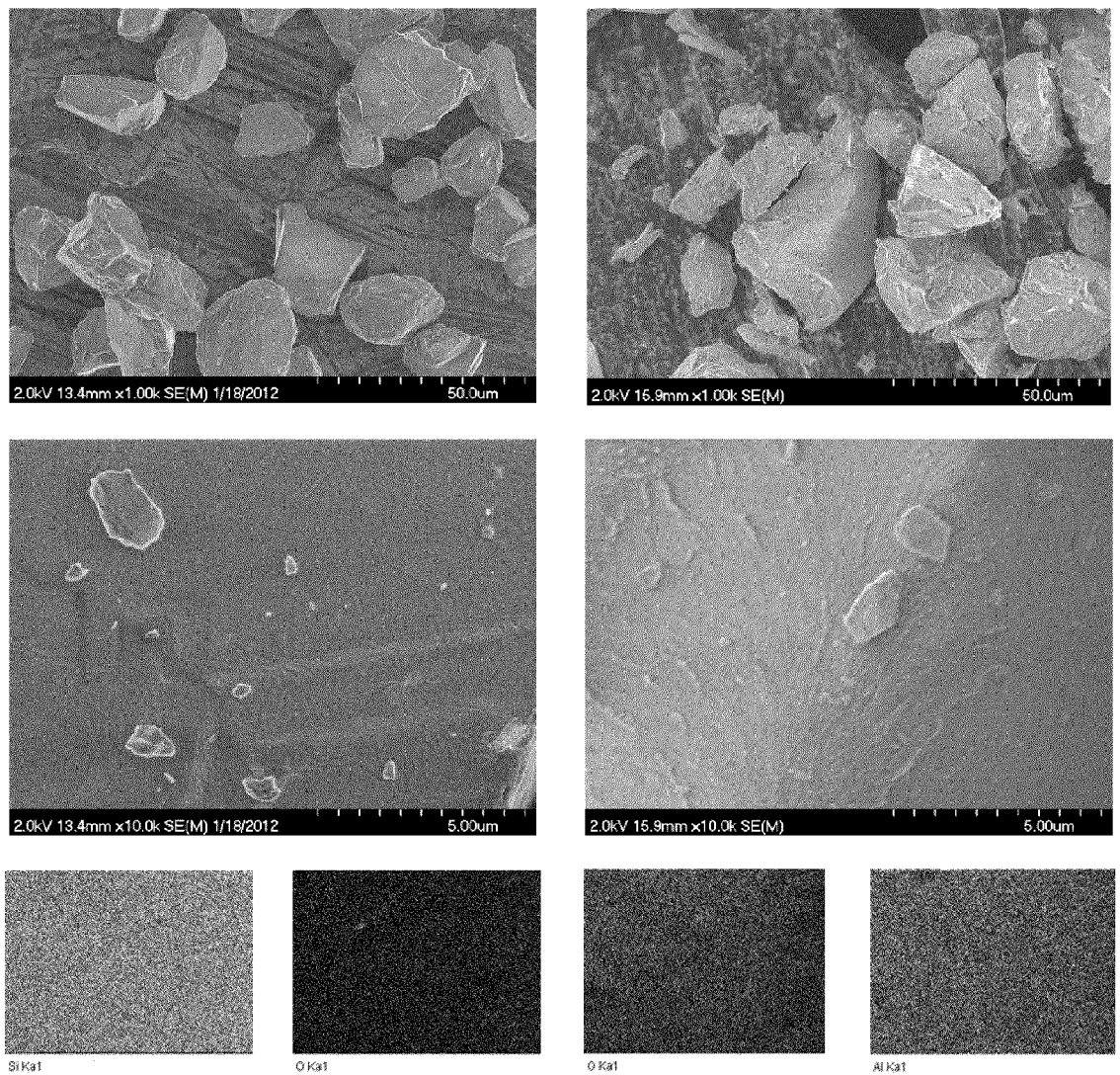
Figure 10. Morphologies and EDX analysis of the oxidized particles before and after one coating with alumina.

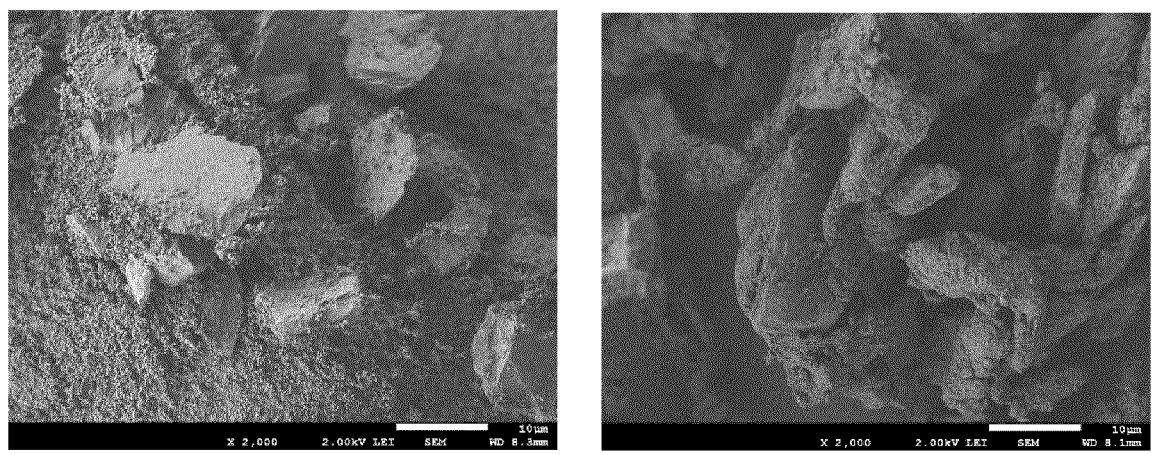
Figure 11. Morphologies of the SiC - alumina mixture without alumina sol (left) and with alumina sol (right).

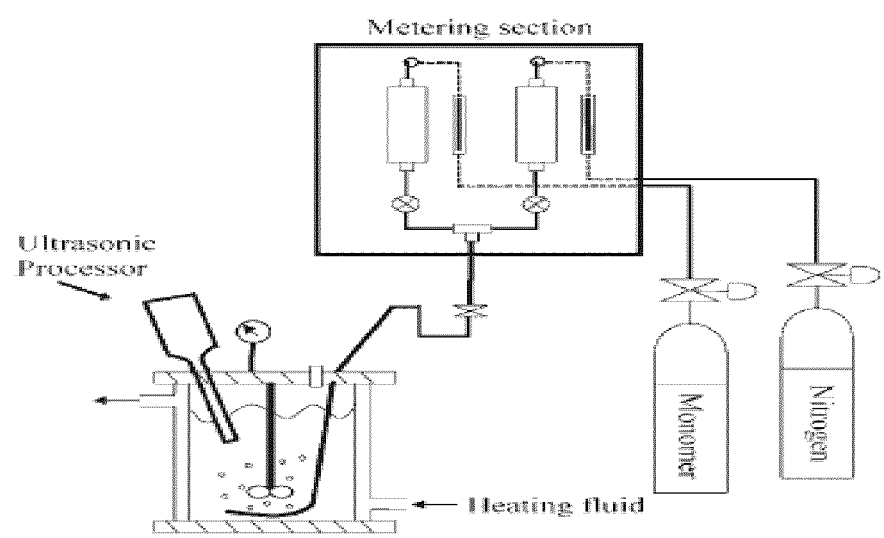
Figure 12. Schematic of the set up for the polymerization.

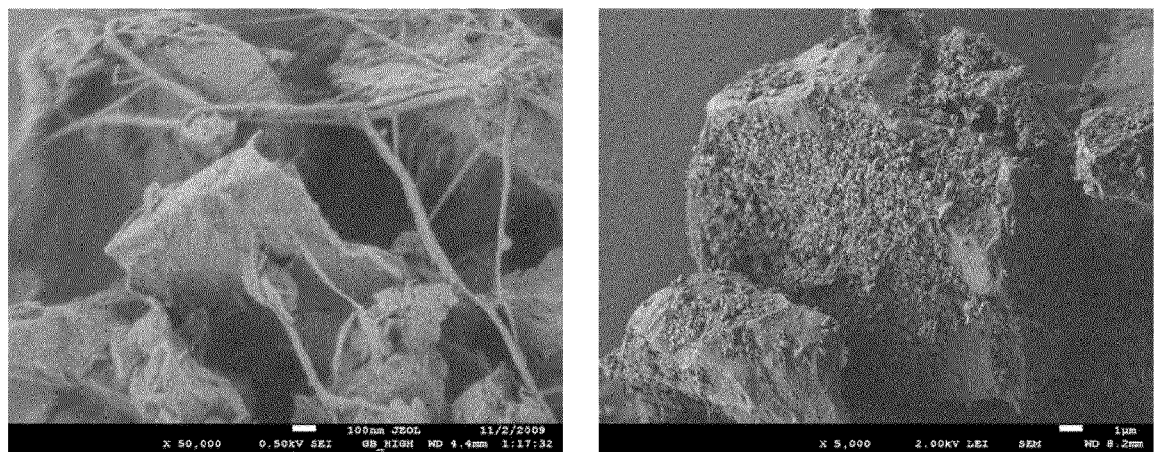
Figure 13. SEM micrographs of α-SiC 1.7 μm- 13 wt% PE (left) and α-SiC 15 μm - alumina powder ( 300 nm) - 6 wt% PE.

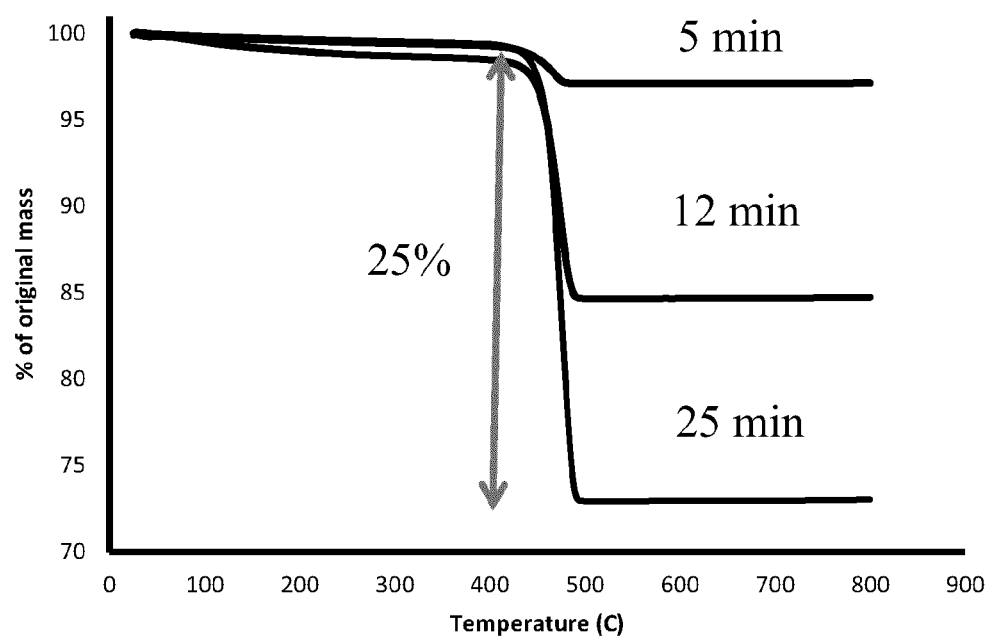
Figure 14. TGA profile for coated SiC 1.7 μm particle at different reaction times (5, 12 and 25 minutes; 65°C; 50 kPa).

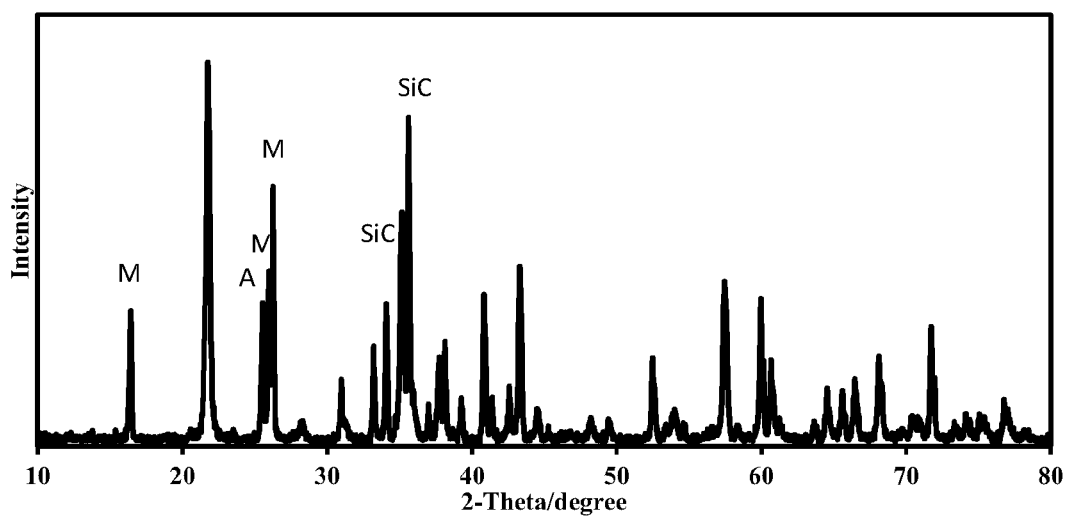
Figure 15. XRD patterns of porous SiC ceramic sintered at the indicated temperature 1500°C for 3 hours (A is alumina, C is cristobalite, M is mullite and SiC is silicon carbide).

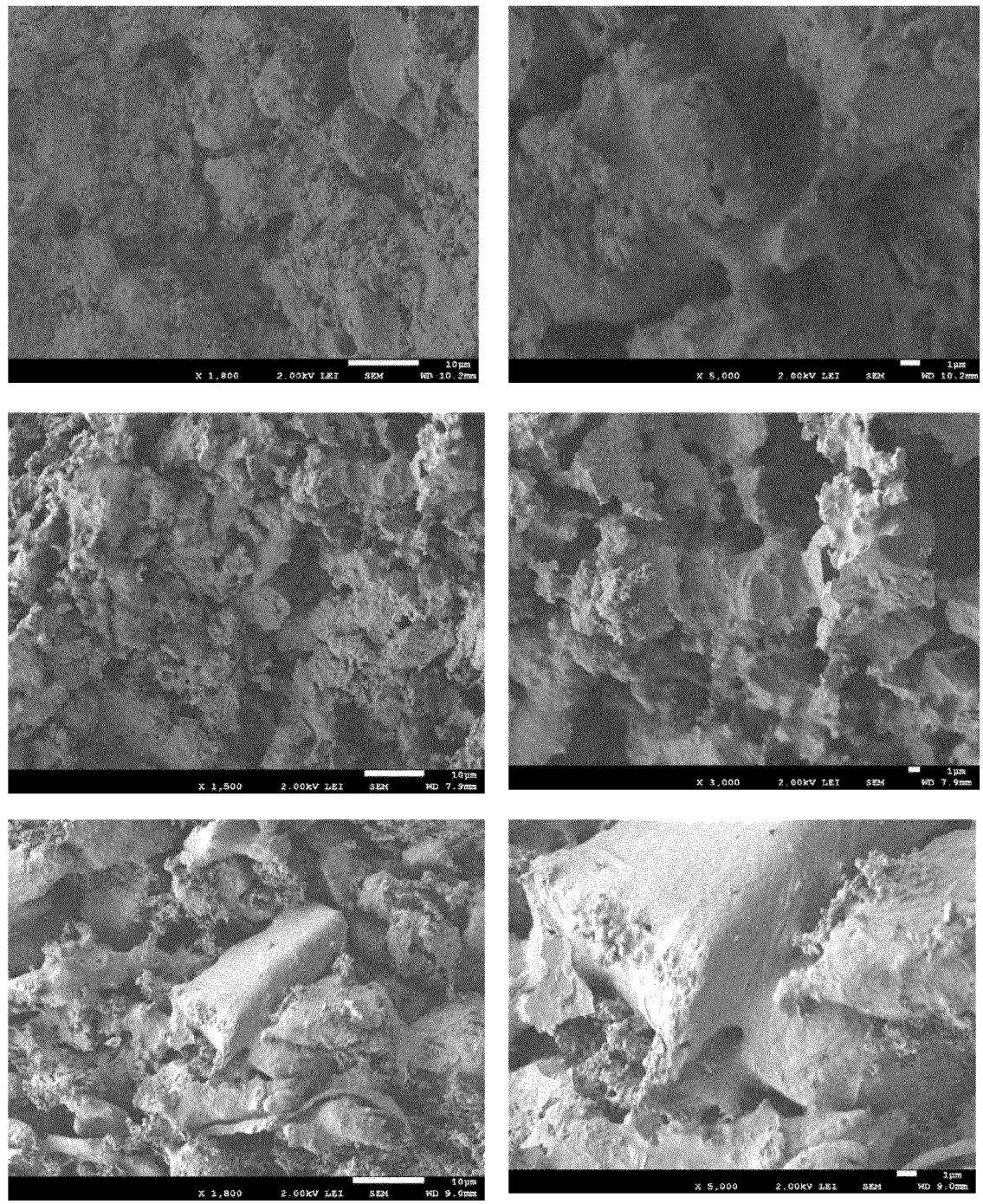
Figure 16. SEM micrograph of porous SiC ceramics (a) SiC:Al$_2$O$_3$:Polyethylene (6 W/W); (b) SiC:Al$_2$O$_3$/Alumina sol:Graphite and (c) SiC:Al$_2$O$_3$:Graphite, sintered at 1450°C for 3 hours. The weight ratio of SiC to alumina is 5:3 w/w with 50 MPa.

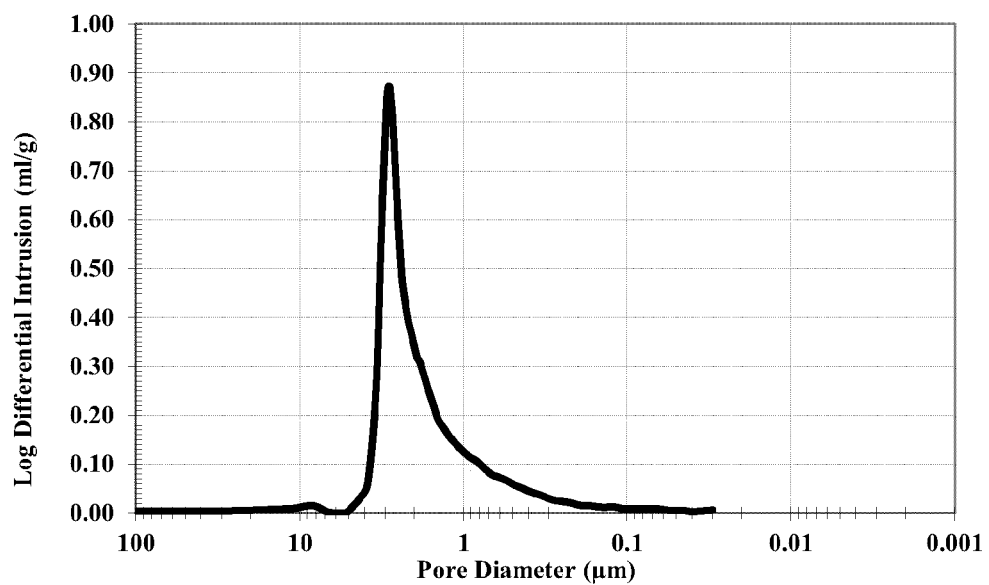
Figure 17. Pore size distribution of porous SiC ceramics with the addition of graphite (10 µm), where the weight ratio of SiC-Al$_2$O$_3$ and graphite in green bodies was 5:3:2, the forming pressure of green bodies was 50 MPa, and the sintering temperature 1500°C for 3 hours.

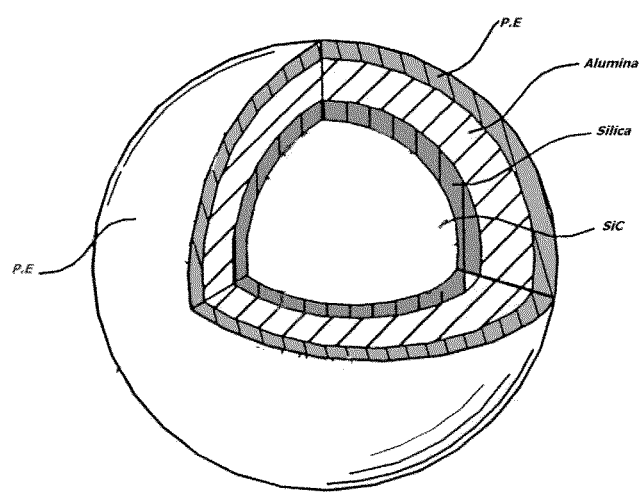
Figure 18. Schematic of final coated SiC particles.

POROUS SIC CERAMIC AND METHOD FOR THE FABRICATION THEREOF

CROSS-REFERENCE TO RELATED APPLICATIONS

This application is a National Entry Application of PCT application no PCT/CA2012/050586 filed on Aug. 24, 2012 and published in English under PCT Article 21(2), which itself claims benefit of U.S. provisional application Ser. No. 61/526,849, filed on Aug. 24, 2011. All documents above are incorporated herein in their entirety by reference.

FIELD OF THE INVENTION

The invention relates generally to porous silicon carbide (SiC) ceramics and methods for the fabrication thereof. More specifically, the invention relates to a method that involves at least one of partial oxidation technique, sol-gel technique and in-situ polymerization leading to a porous SiC ceramic with improved properties.

BACKGROUND OF THE INVENTION

Porous SiC ceramics have a large number of applications. They are often used under conditions involving high temperatures and/or corrosion activity. For example, they are used for exhaust gas cleaning at high temperatures as filters, for gas heating in pore burners, for solar installations, for heat treatment substrates. They are also used as catalyst carriers, combustion aids and insulators. It is thus necessary that porous SiC ceramics present a high stability at high temperatures, a high resistance to corrosion and a high mechanical strength. It is also necessary that a SiC ceramic have a high level of porosity with a desired pore size distribution.

Many engineering reports indicate that a major disadvantage of SiC is that it does oxidize to silicon dioxide ($SiO_2$) relatively easily at high temperature, especially in humid environments. The micro structure of the ceramic changes during the oxidation process, which leads to reduction in bulk strength. This is illustrated for example in FIG. 1. In addition, high sintering temperature and non-homogeneity in the mixture of the starting material bring some limitations and significantly affect the cost as well as the efficiency of the final product.

Methods for the fabrication of SiC ceramics are known in the art. Such methods are disclosed for example in the documents listed herein in the References section at [1].

There is still a need for a method for the fabrication of porous SiC ceramics which allows for at least a certain degree of control over properties of the ceramic such as porosity, pore size distribution, mechanical strength at low sintering temperature.

SUMMARY OF THE INVENTION

The inventors have discovered a method for the fabrication of porous SiC ceramic. The method involves at least one of: partial oxidation technique, sol-gel technique and in-situ polymerization. More specifically, the method comprises oxidizing particles of SiC ceramic thereby forming amorphous silica on the surface of the particles. The oxidized SiC particles are then mixed with an additive. Alternatively, layer(s) of the additive is (are) deposited on their surface by sol-gel technique. The oxidized SiC particles mixed or coated with the additive are then mixed with at least one pore-former. Alternatively, the oxidized SiC particles mixed or coated with the additive are coated with layer(s) of a polymer or pore-former by in-situ polymerization. In embodiments where the oxidized SiC particles are mixed with an additive and a pore-former or polymer, a further additive may be used.

In each of these embodiments, the resulting product is then compacted into a green body which is heated and sintered to yield the porous SiC ceramic material.

In the method of the invention, the sintering temperature is lower than temperatures generally applied in such process, resulting in a porous SiC ceramic material which has improved characteristics such as mechanical strength, resistance to oxidation. The method of the invention allows for a certain degree of control over porosity and pore size distribution of the resulted material.

The invention thus provides for the following:

1. A method for the fabrication of porous SiC ceramic, comprising the steps of:
    (a) heating SiC particles in the presence of air to produce amorphous $SiO_2$ on the surface of the particles;
    (b1) mixing the particles obtained in step (a) with at least one additive;
    (c1) mixing the mixture obtained in step (b1) with at least one pore-former;
    (d) compacting the particles obtained in step (c1) into a green body; and
    (e) heating the green body in the presence of air to yield the porous SiC ceramic.

2. A method for the fabrication of porous SiC ceramic, comprising the steps of:
    (a) heating SiC particles in the presence of air to produce amorphous $SiO_2$ on the surface of the particles;
    (b2) coating the particles obtained in step (a) with at least one layer of at least one additive;
    (c1) mixing the particles obtained in step (b2) with at least one pore-former;
    (d) compacting the mixture obtained in step (c1) into a green body; and
    (e) heating the green body in the presence of air to yield the porous SiC ceramic.

3. A method for the fabrication of porous SiC ceramic, comprising the steps of:
    (a) heating SiC particles in the presence of air to produce amorphous $SiO_2$ on the surface of the particles;
    (b1) mixing the particles obtained in step (a) with at least one additive;
    (c2) coating the particles of the mixture obtained in step (b1) with at least one layer of a polymer or pore-former;
    (d) compacting the particles obtained in step (c2) into a green body; and
    (e) heating the green body in the presence of air to yield the porous SiC ceramic.

4. A method for the fabrication of porous SiC ceramic, comprising the steps of:
    (a) heating SiC particles in the presence of air to produce amorphous $SiO_2$ on the surface of the particles;
    (b2) coating the particles obtained in step (a) with at least one layer of at least one additive;
    (c2) coating the particles obtained in step (b2) with at least one layer of a polymer or pore-former;
    (d) compacting the particles obtained in step (c2) into a green body; and
    (e) heating the green body in the presence of air to yield the porous SiC ceramic.

5. The method according to any one of 1 to 4 above, wherein the additive is $Al_2O_3$ (alumina), $CeO_2$, $Y_2O_3$, MgO, or a sol form thereof, or a sub-micro powder form thereof, or a mixture thereof, or a mixture thereof wherein at least one of additive is in sol form and at least one other additive is in sub-micro powder form.

6. The method according to any one of 1 to 4 above, wherein the additive is a mixture of: $Al_2O_3$ and $CeO_2$, $Al_2O_3$ and $Y_2O_3$, or $Al_2O_3$ and MgO.

7. The method according to any one of 1 to 5 above, wherein the additive is $Al_2O_3$, alumina sol, or a mixture of alumina sol and sub-micro alumina powder.

8. The method according to 1 or 3 above, wherein, in step (b1), the additive is in dry powder form.

9. The method according to 1 or 2 above, wherein, in step (c1), the pore-former is in dry powder form.

10. The method according to 9 above, wherein the pore-former is graphite, yeast, polymethyl methacrylate (PMMA), starch, jute, flax, cellulose or a lignin fiber.

11. The method according to any one of 1 to 4 above, wherein step (a) is performed at a temperature of about 800-1350° C., preferably at a temperature of about 900-1300° C., more preferably at a temperature of about 1100-1250° C.

12. The method according to any one of 1 to 4 above, wherein step (a) is performed by oxidation technique, during a period of about 3-9 hours, preferably during a period of about 4-8 hours.

13. The method according to 2 or 4 above, wherein step (b2) is performed by sol-gel technique.

14. The method according to claim 3 or 4 above, wherein in step (c2), the polymer is formed from a monomer material by in-situ polymerization.

15. The method according to 14 above, wherein step (c2) is performed using a Zeigler-Natta catalyst, preferably with a co-catalyst.

16. The method according to 15 above, wherein the catalyst is $TiCl_4$ and the co-catalyst is triethylaluminum.

17. The method according to 3 or 4 above, wherein step (c2) is performed by emulsion polymerization.

18. The method according to 3 or 4 above, wherein step (c2) is performed at a temperature of about 50-69° C., preferably at a temperature of about 55-67° C.

19. The method according to 3, 4 or 18 above, wherein a drying step is performed after step (c2), prior to performing step (d), at a temperature of about 50-90° C., preferably at a temperature of about 80-70° C.

20. The method according to 14 above, wherein the monomer material is ethylene, propylene or methyl methacrylate.

21. The method according to 3 or 4 above, wherein the polymer is polyethylene, polypropylene or poly(methyl methacrylate).

22. The method according to 14 above, wherein the monomer material is ethylene and the polymer is polyethylene.

23. The method according to 2 or 4 above, wherein, in step (b2), the number of layer of the additive is about 1-4, preferably 2.

24. The method according to any one of 1 to 4 above, wherein the polymer in the green body represents about 10-30%, preferably about 20% of the volume of SiC ceramic.

25. The method according to 3 or 4 above, wherein, in step (c2), the number of layer of the polymer is about 1-3, preferably 2.

26. A method for the fabrication of porous SiC ceramic, comprising the steps of:
(a) heating SiC particles in the presence of air to produce amorphous $SiO_2$ on the surface of the particles;
(b1) mixing the particles obtained in step (a) with $Al_2O_3$;
(c1) mixing the mixture obtained in step (b1) with graphite;
(d) compacting the particles obtained in step (c1) into a green body; and
(e) heating the green body in the presence of air to yield the porous SiC ceramic.

27. A method for the fabrication of porous SiC ceramic, comprising the steps of:
(a) heating SiC particles in the presence of air to produce amorphous $SiO_2$ on the surface of the particles;
(b2) coating the particles obtained in step (a) with at least one layer of $Al_2O_3$;
(c1) mixing the particles obtained in step (b2) with graphite;
(d) compacting the mixture obtained in step (c1) into a green body; and
(e) heating the green body in the presence of air to yield the porous SiC ceramic.

28. A method for the fabrication of porous SiC ceramic, comprising the steps of:
(a) heating SiC particles in the presence of air to produce amorphous $SiO_2$ on the surface of the particles;
(b1) mixing the particles obtained in step (a) with $Al_2O_3$;
(c2) coating the particles of the mixture obtained in step (b1) with at least one layer of polyethylene;
(d) compacting the particles obtained in step (c2) into a green body; and
(e) heating the green body in the presence of air to yield the porous SiC ceramic.

29. A method for the fabrication of porous SiC ceramic, comprising the steps of:
(a) heating SiC particles in the presence of air to produce amorphous $SiO_2$ on the surface of the particles;
(b2) coating the particles obtained in step (a) with at least one layer of $Al_2O_3$;
(c2) coating the particles obtained in step (b2) with at least one layer of polyethylene;
(d) compacting the particles obtained in step (c2) into a green body; and
(e) heating the green body in the presence of air to yield the porous SiC ceramic.

30. The method according to 27 or 29 above, wherein, in step (b2) alumina sol is used and the step comprises (i) treating the particles obtained in step (a) with $NH_4OH$, (ii) mixing the treated particles with alumina sol, (iii) optionally repeating steps (i) and (ii).

31. The method according to 30 above, wherein alumina sol is mixed with sub-micro alumina powder.

32. The method according to 28 or 29 above, wherein, in step (c2), polyethylene is formed from ethylene by in-situ polymerization.

33. The method according to 32 above, wherein the in-situ polymerization is performed in a reactor at a temperature of about 50-69° C., preferably about 55-67° C.; and/or at a pressure of about 1.0-4 bars, preferably about 1.5-3.5 bars; and/or for a period of about 5 minutes to 2 hours, preferably about 5 minutes to 1 hour.

34. The method according to 26 or 28 above, wherein $Al_2O_3$ is in dry powder form.

35. The method according to any one of 1 to 34 above, wherein the particle size of SiC is about 0.02-22.3 μm; and/or the thickness of $SiO_2$ is about 0.001-3.3 μm, preferably about 0.001-2.8 μm; and/or the thickness of the additive is about 0.001-3.0 μm, preferably about 0.002-2.7 μm.

36. The method according to any one of 1 to 35 above, wherein the heating in step (e) is a two-stage heating, a first stage at a temperature below about 1000° C., preferably below about 900° C., preferably below about 850° C.; and a second stage or sintering stage at a temperature of about 1200-1600° C., preferably about 1350-1550° C.

37. The method according to 36 above, wherein during the first stage, the polymer is burned and pores are formed.

38. The method according to 36 above, wherein during the second stage or sintering stage, a bonding material is formed and the SiC particles are bonded together.

39. The method according to 26 or 27 above, wherein the heating in step (e) is a two-stage heating, a first stage at a temperature below about 1000° C., preferably below about 900° C., preferably below about 850° C.; and a second stage or sintering stage at a temperature of about 1200-1600° C., preferably about 1350-1550° C., and wherein during the first stage, graphite is burned and pores are formed, and wherein during the second stage or sintering stage, mullite is formed and the SiC particles are bonded together.

40. The method according to any one of 36 to 39 above, wherein a first heating rate in the first stage is about 1-3° C./min., preferably about 2° C./min., and a cooling rate after the second stage or sintering stage is complete is about 3-7° C./min., preferably about 5° C./min.

41. The method according to any one of 1 to 4 and 26 to 29 above, wherein step (d) is conducted at a pressure of about 20-70 MPa, preferably about 30-80 MPa, more preferably about 50 MPa.

42. The method according to 1, 2, 26 or 27 above, further comprising a step (c1-2) of mixing the mixture obtained in step (c1) with a further additive prior to conducting step (d).

43. The method according to 42 above, wherein the further additive is polyvinyl alcohol (PVA) or polyvinyl butyral (PVB).

44. The method according to 42 or 43 above, wherein the further additive is in amount of about 1-5 wt %, preferably about 2 wt %.

45. The method according to 42 above, wherein when a solvent used in the method is an alcohol, preferably ethanol, the further additive is polyvinyl butyral (PVB); and when the solvent used in the method comprises water, the further additive is polyvinyl alcohol (PVA).

46. The method according to any one of 1 to 45 above, wherein a volume ratio of SiC, additive and pore-former or polymer is about 2.5-5:0.5-1.5:0.6-2, preferably about 3-3.5:0.8-1.2:0.6-1.5, more preferably about 3.1:1:1.1.

47. A porous SiC ceramic fabricated by the method of any one of 1 to 46 above.

48. A porous SiC ceramic according to 47 above, having a pore size of about 0.005-5 μm, preferably 0.1-6 μm.

49. A porous SiC ceramic according to 47 or 48 above, having a flexural strength between about 8 to 80 MPa.

50. A porous SiC cerami according to any one of claims 47 to 49, having a porosity of about 30 to 60%.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 1 illustrates the crystallization of a prior art SiC ceramic during operation.

FIG. 2 illustrates the scanning electron microscopy (SEM) images of raw SiC: (a) α-SiC 1.7 μm; (b) α-Si 22.1 μm; (c) α-Si 12.1 μm.

FIG. 3 illustrates XRD patterns of the original α-SiC 1.7 μm powder (a) and after oxidation at various temperatures: (b) 1200° C. and (c) 1400° C. for 4 hours in air (S is SiC and C is cristobalite).

FIG. 4 illustrates XRD patterns of the original α-SiC 22.1 μm powder, and after oxidation at various temperatures in air.

FIG. 5 illustrates relative mass changes of α-SiC 22.1 μm against oxidation time (8 hours).

FIG. 6 illustrates relative mass changes of α-SiC 1.7 μm against oxidation time (8 hours).

FIG. 7 illustrates SEM micrograph of α-SiC 1.7 μm before and after oxidation at 1200° C. for 5 hours in air.

FIG. 8 illustrates X-ray diffraction patterns for dried alumina sol and after heat treatment.

FIG. 9 illustrates FTIR spectra obtained for the dried and heat treated boehmite samples.

FIG. 10 illustrates morphologies and EDX analysis of the oxidized particles before and after one coating with alumina.

FIG. 11 illustrates morphologies of the SiC-alumina mixture without alumina sol (left) and with alumina sol (right).

FIG. 12 illustrates schematic of the set up for the polymerization.

FIG. 13 illustrates SEM micrographs of α-SiC 1.7 μm-13 wt % PE (left) and α-SiC 12.1 μm-alumina powder (300 nm)-6 wt % PE.

FIG. 14 illustrates TGA profile for coated SiC 1.7 μm particle at different reaction times (5, 12 and 25 minutes; 65° C.; 50 kPa).

FIG. 15 illustrates XRD patterns of porous SiC ceramic sintered at 1500° C. for 3 hours (A is alumina, C is cristobalite, M is mullite and SiC is silicon carbide).

FIG. 16 illustrates SEM micrograph of porous SiC ceramics (a) SiC:Al$_2$O$_3$:Polyethylene 3.12:1:1.1 (volume ratio); (b) SiC:Al$_2$O$_3$/Alumina sol:Graphite 3.12:1:1.8 (volume ratio); and (c) SiC:Al$_2$O$_3$:Graphite 3.12:1:1.8 (volume ratio). In each case, the forming pressure of green bodies was 50 MPa, and the sintering temperature was 1500° C. for 3 hours.

FIG. 17 illustrates pore size distribution of porous SiC ceramics with the addition of graphite (10 μm), where the weight ratio of SiC—Al$_2$O$_3$ and graphite in green bodies was 3.1:1:1.8, the forming pressure of green bodies was 50 MPa, and the sintering temperature was 1500° C. for 3 hours.

FIG. 18 illustrates schematic of final coated SiC particles.

DESCRIPTION OF ILLUSTRATIVE EXAMPLES AND EMBODIMENTS

The method of the invention involves at least one of: partial oxidation technique, sol-gel technique and in-situ polymerization. More specifically, the method comprises oxidizing particles of SiC ceramic thereby forming amorphous silica on the surface of the particles. The oxidized SiC particles are then mixed with an additive. Alternatively, layer(s) of the additive is (are) deposited on their surface by sol-gel technique. The oxidized SiC particles mixed or coated with the additive are then mixed with at least one pore-former. Alternatively, the oxidized SiC particles mixed or coated with the additive are coated with layer(s) of a polymer or pore-former by in-situ polymerization. In embodiments where the oxidized SiC particles are mixed with an additive and a pore-former or polymer, a further additive may be used.

In each of these embodiments, the resulting product is then compacted into a green body which is heated and sintered to yield the porous SiC ceramic material.

As used herein, the term "pore-former" refers to a material that can combust and burn partially or completely during heating and leave hollow spaces behind. Such material can be graphite or a polymer or any other suitable material.

As used herein, the term "about" shall be construed as providing a plus or minus 10% to the value to which it is associated.

The present invention is illustrated in further details below by non-limiting examples and embodiments.

In embodiments of the invention, the green body of porous ceramic consisted of SiC as the major component, alumina (Al2O3) as additive and a polymer as pore-former.

Three types of SiC powders with differing particle sizes used in embodiments of the invention were obtained from LABMAT, Inc. Canada. Properties of the specimens, which were measured, are outlined in Table 1. Observation from scanning electron microscopy (SEM), as shown in FIG. 2, shows that micro particles are irregular in shape and some fine powders exist on the surface of the large particles, which causes an increase of the surface area of powders.

TABLE 1

Characteristics of starting materials (SiC)

| Particle | Specific surface area ($m^2/g$) | Mean size (μm) (by P.S.A.) | Density ($g/cm^3$) | Phase | SiC (wt %) Impurity |
|---|---|---|---|---|---|
| SiC(1) | 11 | 1.7 | 3.2 | α | 99.5%> Zr, Fe, Cr, V, Ti, |
| SiC(2) | 0.85 | 22.1 | 3.2 | α | 99.5%> Zr, Fe, Cr, V |
| SiC(3) | — | 12.1 | 3.2 | α | 99.5%> Zr, Fe, Cr, V |

Additive

In embodiments of the invention, the sintering aid or additive used was alumina, which was in the sol-gel form or sol-gel form mixed with sub-micro alumina powder. In other embodiments, aluminum isopropoxide $(Al(OC_3H_7)_3$ Aldrich, >98%; AlP) was used as precursor in the formation of alumina sol.

Pore Former

In embodiments of the invention, polymers such as polyethylene, polypropylene and poly(methyl methacrylate) (PMMA), which were synthesized and grafted onto the surface of the SiC particles. The polymer was used as pore-former.

Example 1

Oxidation Behaviour of SiC Particles

SiC particles were oxidized in air at temperatures of 900° C., 1100° C., 1200° C. and 1300° C. with a soaking time of 3 to 9 hours. During each measurement, the evaluated amount of SiC particles was heated at a rate of 10° C./min in the furnace. After heat treatment, the weight of the sample was measured again. FIGS. 3 and 4 give the X-ray diffraction (XRD) patterns of α-SiC 1.7 μm and α-SiC 22.1 μm before and after oxidation, at different temperatures, respectively. At temperatures above 1250° C., the phase of $SiO_2$ changes to form cristoballite. The oxidation data, plotted as relative mass changes versus time for different samples in an 8-hour oxidation is given in FIGS. 5 and 6. As can be seen on these figures, the amount of relative mass change is in direct relation to the oxidation temperature and has an inverse relation to the particle size. The morphology of the α-SiC 1.7 μm before and after oxidation is illustrated in FIG. 7. It was found that the original particles are sharp, but after oxidation, the particles become smoother.

Based on the calculated weight changes in as-received particles and oxidized particles, and assuming that these particles are spherical, the thickness of $SiO_2$ are determined theoretically and the result are compared with transmission electron microscopy (TEM) and SEM. The results obtained indicated that the total weight gain of the SiC particles depends on the temperature and the size of the particles.

As will be understood by a skilled person, oxidation of SiC particles can be conducted in any suitable oxidizing atmosphere including but not limited to air, oxygen-enriched air.

Coating of SiC Particles with Alumina Using the Sol-Gel Technique

The aim of this step is to coat a thin layer of alumina on SiC particles via the sol-gel technique. The source of the alumina can be either alumina sol or a mixture of alumina sol and sub-micro alumina powder.

Example 2

Synthesis of Alumina Sol

Alumina sol was synthesized with a method developed by Yoldas [6]. Aluminum isopropoxide (AlP, Aldrich, 98%) was used as the alkoxide source of alumina. In a typical experiment, distilled water was heated up to 85° C. followed by addition of AlP in powder form. After one hour of stirring, the resulting white precipitate was peptized by adding a small amount of HCl, 10%, (Merck, 37%) in order to set the pH of the solution to 4. A transparent solution was formed after 24 hours of stirring. The resulting sol was cooled to room temperature. The reaction was performed in the four-neck reactor equipped with a heater and a magnetic stirrer under reflux. The molar ratio of water to AlP was 100:1. The sol was further heated at 45° C. in order to increase the concentration of the sol from 0.56 M to 1.5 M.

Example 3

Alumina Sol Characterization

FIG. 8 shows the X-ray diffraction patterns for dried alumina sol after heat treatment, at various temperatures. The XRD pattern of dried alumina is well matched with the reference data of AlOOH (JCPDS 49-0133), which confirms the formation of boehmite. After heating the boehmite powder at 550° C. for 2 hours, two new peaks appear at 46.2 and 67.3, which are the characteristic peaks for γ-$Al_2O_3$, according to JCPDS 29-0063. Further heating of the sample at 1300° C. causes phase conversion to the α-phase as determined by JCPDS 42-1468. Consequently, heating the obtained alumina sol results in the phase transformation from boehmite to γ as one of the meta-stable phases of alumina and, finally, to the stable α-alumina (corundum) phase.

FIG. 9 presents the FTIR spectra obtained for the dried and heat treated boehmite samples at different temperatures (150° C., 350° C., 550° C. and 1300° C.). In the sol dried at room temperature, seven major peaks can be identified, whereas by increasing the temperature the number of peaks decreases. The broad band in the spectral range of 3300-3500 indicates the presence of the —OH stretching of hydrogen bonded aluminum oxy-hydroxide (AlO(OH)). The next band observed at 1635 cm$^{-1}$, which is mainly due to the bending vibration of the residual water molecule [4]. The subsequent absorption peak observed at 1074 cm$^{-1}$ is assigned to the Al—OH bending mode of boehmite. Also, it should be mentioned that when the sample was progressively heated, the intensity of the above peaks decreased. It should be mentioned that the number of —OH bands on the surface of the alumina is eliminated during the calcination procedure. The band observed at 738 corresponds to the bending vibration of the AlO$_4$ groups and the band at 613 is assigned to the AlO$_6$ octahedra. The peaks at 889 and 470 are associated with the existence of pseudo boehmite in the sample. As the temperature increased to up to 550° C. these peaks disappeared and broad peaks were formed in the lower frequency range (500-900 cm$^{-1}$) due to the coordination of Al atoms and the transition of the alumina phase to $\gamma$-Al$_2$O$_3$. A further heating of the boehmite sample at 1300° C. forms three bands at 640, 605 and 453 cm$^{-1}$, which confirms the presence of $\alpha$-alumina. It should be mentioned that when the alumina sol is heated at 350° C., the color of the resulting sample appears brown due to the carbon residue during decomposition. At temperatures higher than 550° C. a white powder is obtained. The FTIR results strongly support XRD studies.

Example 4

Coating of the Particles with Alumina Using Alumina Sol Mixed with alumina powder Before coating $\alpha$-SiC particles, they may be heated at 1200° C. for 5 hours in air using an electric furnace to form a silica layer. Afterward, the particles may be mixed with NH$_4$OH for 4 hours at ambient temperature followed by drying in the vacuum oven at 60° C. The pre-treated particles were stirred in the alumina sol for 2 hours and then filtered to remove the excess alumina sol and, finally, dried at 60° C. In order to form the desired layer of alumina on the substrates, a multilayer coating was prepared by repeating the above-mentioned procedure. The coated particles were finally heated at 550° C. for 5 hours. The morphologies of the oxidized particles before and after one coat with alumina sol are shown in FIG. 10. The map scan acquired across the particles shows that particles are uniformly coated with alumina. Depending on the concentration of alumina sol and according to the XPS results, the thickness of the coated layer can be more than 10 nm after one coating.

If it is desire to increase the amount of alumina, sub-micro alumina powder is added to alumina sol. Homogeneity of the mixture of SiC and alumina particles is increased when a mixture of alumina sol and sub-micro alumina powder is used. This is illustrated in FIG. 11 wherein the morphologies of the SiC-alumina (3.1:1 volume ratio) mixture with and without alumina sol is compared. As it can be seen in FIG. 11, when the particles were mixed in the alumina sol at a pH of 4, most of the alumina particles were attached onto the surface of the SiC particles.

Example 5

Coating of SiC Based Particles with Polymer

To coat particles with polyethylene, the following materials were used. Ethylene with a purity of 99.5% was provided by the Canadian Liquid Air factory, and used after treatment with molecular sieves. Hexane was dried over molecular sieves for 24 hours. The Ziegler-Natta catalyst used in this study was TiCl4, which was supplied by Acros. Triethylaluminum (AlEt3), purchased from Sigma-Aldrich, was used as co-catalyst. FIG. 12 shows the schematic of the set up. In this experiment, particles were dried for 1 day at 200° C. under vacuum conditions. Then, the dried particles were introduced with dried hexane into a glass reactor equipped with an ultrasonic mechanical stirrer in order to break up any agglomerates. Thereafter, dried nitrogen, at a given flow rate, was purged into the reactor in order to eliminate any oxygen. During the mixing process, the reactor was heated by a bath circulator to about 60-67° C. After about 2 hours, the desired amount of catalyst TiCl$_4$ was injected through a septum feeding part and was given the proper time (about 20 minutes) to disperse the catalyst into the reactor. Afterward, a co-catalyst was injected in the same manner as the catalyst. The amount of catalyst is determined by calculating the total surface area of the particles, with the assumption that the surface of a particle corresponds to the maximum density of a hydroxyl group. The molar ratio of catalyst to co-catalyst is one. By using ethylene instead of nitrogen, the reaction starts and a coating of polyethylene on the surface of particles is formed. The polymerization is conducted at evaluated temperatures and suitable ethylene pressure for a given period of time. The reaction is terminated by adding ethanol into the reactor. The composition products were then filtered and washed with a large amount of ethanol several times and, finally, dried under vacuum at 60° C. for 24 hours.

As can be seen from the above, the major parameters of this work are as follows: temperature of reaction (about 50-69° C.); pressure of the reactor (about 1.5-3.5 bars); flow rate of ethylene; reaction time (from 10 minutes to 1 hour, as determined based on the desired coating thickness).

It should be noted that the maximum temperature of this reaction is limited by the boiling point of reaction solvent, hexane and the Ziegler-Natta catalyst, TiCl4, at the working pressure. The morphologies of the coated particles are shown in FIG. 13. When the mixture of alumina and SiC powders is subjected to in-situ polymerization, the polymer causes the alumina particles to attach onto the surface of the SiC particle as shown in FIG. 13. The TG result determines the amount of polyethylene on the particles as shown in FIG. 14.

Example 6

Fabrication of Porous Ceramic

The final coated powder is pressed into a rectangular specimen of about 4.5 mm×10.0 mm×50 mm under 30-80 MPa pressure using a steel die resulting into the green body. Thus the green body is constituted of particles of the final coated powder. One such particle is illustrated in FIG. 18. The green bodies are placed into an alumina crucible and heated to burn out the pore-former. This occurs at temperatures below 900° C. at a heating rate of about 2° C./min. The green bodies are then sintered in the air at 1350° C., 1400°

C., 1450° C., 1500° C. and 1550° C. for about 2-4 hours. Thereafter, the green bodies are cooled at a cooling rate of about 5° C./min.

As will be understood by a skilled person, formation of the green body can be performed by any other suitable technique known in the art. Such technique may be for example pressing including uniaxial pressing and isostatic pressing, extrusion, casting including slip casting and shell casting, injection molding [7].

It appears from the above that the green body can be formed from the following methods:

mixing SiC particles, alumina powders and graphite (traditional method);
mixing SiC particles, alumina sol/alumina powders and graphite;
coating SiC particles and alumina powders with a polymer using in-situ polymerization;
coating SiC particles, which are already coated with alumina sol/alumina powders, with a polymer using in situ polymerization.

It should be noted that typically for the making the green body, the starting materials (SiC, alumina and graphite) are ball milled in the presence of binders such as such as polyvinyl butanol (PVB) or polyvinyl alcohol (PVA) in a solvent comprising an alcohol such as ethanol, or water. The amount of the binder is between about 1 to 5 w/w % preferably about 2.5 w/w°/0. However, when the powders are coated with the polymer addition of such binder is not necessary. Accordingly, in embodiments of the invention wherein oxidized SiC particles are mixed with the additive and pore-former or polymer, PVB or PVA can be added to the mixture.

The pore former is a material that can combust and burn partially or completely during heating and leave hollow spaces behind. Such material can be a polymer or any other suitable material. Such material comprises for example graphite, yeast, polymethyl methacrylate (PMMA), starch, jute, flax, cellulose or a lignin fiber.

At temperatures greater than about 1400° C., alumina and cristobalite reacted together and produced mullite. This is illustrated in in FIG. 15 by the XRD analysis shown. Mullite caused SiC particles to bond together as shown in FIG. 16. As can be seen on these figures, pores are formed from burning the pore-former and the stacking of the particles is connected together. Pore size distribution and open porosity are measured by mercury porosimetry as shown in FIG. 17. The value of open porosity is about 46%. Flexural strength was measured via a three-point bending method. The mechanical strength of the porous SiC ceramic depends strongly on the fabrication method. Table 2 gives the results of the flexural strength of the porous ceramic porous, which was formed by various methods. The sintering temperature was 1500° C. and samples were heated at this temperature for three hours. The volume ratio of SiC and alumina was 3.12:1.1. The flexural strength increased significantly when the particles were coated with alumina sol or a polymer compared to the traditional method. Indeed, coating of the SiC particles with alumina sol or a polymer causes alumina or any other sintering additive present to be more attached on the surface of the SiC particles in comparison to the attachment when traditional methods are used. This decreases the mass diffusion resistance between alumina and cristobillite and the amount of mullite formed during the sintering process is therefore increased.

As will be understood by a skilled person, in embodiments of the invention, the following parameters are varied resulting in changes on the physical-mechanical properties of the product: variation in the compositions of the green bodies (amount of alumina and polymer); source of alumina (alumina sol alone or mixed with alumina powder); pressure applied during preparation of the green body; sintering temperature; size of the particles.

By increasing the pressure during preparation of the green body and increasing the sintering temperature, porosity is decreased and flexural strength is increased. The invention allows for the formation of mullite at a lower temperature because the diffusion resistance of the material is decreased due to the fact that alumina is in direct contact with silica during sintering. Moreover, since the thermal expansion coefficients of mullite and silicon carbide are similar, the porous product is strongly resistant to thermal shock.

TABLE 2

Flexural strength of the porous SiC ceramic sintered at 1500° C. for 3 hours with a forming pressure of 50 MPa

| Fabrication Method | Flexural Strength (MPa) |
|---|---|
| SiC:$Al_2O_3$:Polyethylene (3.12:1:1.1 volume ratio) | 41.4 |
| SiC:$Al_2O_3$/Alumina sol:Graphite (3.12:1:1.1 volume ratio) | 20.5 |
| SiC:$Al_2O_3$:Graphite (3.12:1:1.1 volume ratio) | 11.4 |

The thickness of $SiO_2$ and alumina will ultimately depend on the particle size of SiC.

Example 7

Fabrication of Mullite-Bonded Porous SiC Ceramic Derived by Oxidation of SiC and Sol Gel Technique Microporous SiC ceramics were fabricated by the oxidation of silicon carbide (SiC) in air, followed by coating them with alumina as additive and adding graphite as a pore former. In this experiment, the oxidized particles were coated with alumina which was obtained from a mixture of alumina sol and sub-micro alumina powder. After being dried in an oven and sieved through a screen, the powder was mixed with graphite in a high energy ball mill and pressed in a die to make a green body. During heating of the green body, graphite was burned out at the temperature lower than about 900° C. and pores were produced. Then at a temperature above about 1350° C., alumina and silica reacted together to make mullite which bonds SiC particles together. The weight ratio of alumina sol to alumina powder was between 95:5 to 70:30, preferably 85:15 w/w %. The weight ratio of graphite to the other components was varied between 5% to 30%, preferably 20%.

Example 8

Fabrication of Mullite-Bonded Porous SiC Derived by Oxidation of SiC and In-Situ Polymerization Microporous SiC ceramics were fabricated by oxidation of silicon carbide (SiC) in air. Afterward, oxidized SiC and dried alumina powder were coated with a polymer using in-situ polymerization followed by drying at 70° C. Next, the powder was sieved and pressed using steel die. During heating of the green body, polymer was burned out at a temperature lower than about 600° C. to produce pores.

Then at a temperature above about 1400° C., alumina and silica reacted together to form mullite which bonds SiC particles together.

As will be understood by a skilled person, other types of additive aside from alumina can be used in the method according to the invention. Such additives include for example $CeO_2$, $Y_2O_3$ and MgO. A mixture of these additives can also be used.

Example 9

Preparation of Bonded Porous SiC Ceramic Using Other Additives $Y_2O_3$ is used as additive. In this embodiment, the sintering temperature is decreased and the mechanical properties of the final product [2] are improved. The amount of $Y_2O_3$ generally used is about 0.5-4 wt %, preferably 2 wt %. Yttrium nitrate hexahydrate 99.8% Aldrich ($Y(NO_3)_3$·$6H_2O$) is used as precursor of $Y_2O_3$ [3]. In other embodiments, $Y_2O_3$ sol is used or a mixture of alumina and $Y_2O_3$ sol is used.

Example 10

Fabrication of Cordieritebonded Porous SiC Ceramic

Cordierite ($2Al_2O_3$·$5SiO_2$·$2MgO$) can be applied as binder of SiC particles due to the very Low coefficient of thermal expansion and outstanding thermal shock resistance. Cordierite was prepared from oxidizing of SiC powder as silica source followed by coating of the powder with bi-component of magnesia-alumina sol with stoichiometric composition of cordierite ($SiO_2$=51.36%, $Al_2O_3$=34.86%, MgO=13.78%). Details for the preparation are known in the art [4].

$CeO_2$ is added in the sol type in order to improve mechanical properties of porous product. The amount of $CeO_2$ may vary between 1-3 wt %, preferably 2 wt %. Cerious nitrate ($Ce(NO_3)_3$·$6H_2O$) was used as the precursor for $CeO_2$. Detail for the preparation of $CeO_2$ is known in the art [5]. After preparation of $CeO_2$ sol, it is mixed with magnesia-alumina sol.

Although the present invention has been described hereinabove by way of specific embodiments thereof, it can be modified, without departing from the spirit and nature of the subject invention as defined in the appended claims.

The present description refers to a number of documents, the content of which is herein incorporated by reference in their entirety.

REFERENCES

[1]
a) M. A. Alvin "Advances Ceramic Materials for Use in High-Temperature Particulate Removal Systems" *Ind. Eng. Chem. Res.* 1996, 35, 3384-3398.
b) J. H. She "Oxidation Bonding of Porous Silicon Carbide Ceramics" *Journal of Material Science* 2002, 37, 3615-3622.
c) U.S. 2010-0071328 of Y. M. Leon et al. entitled "Method for Making a SiC Based Ceramic Body."
d) S. Ding et al. "Fabrication of Mullite-Bonded Porous Silicon Carbide Ceramics by In-Situ Reaction Bonding" *Journal of the European Ceramic Society* 2007, 27, 2095-2102.
e) U.S. Pat. No. 6,214,078 of Way et al. entitled "High Temperature Ceramic Filter."
f) U.S. Pat. No. 7,670,979 of Quadir et al. entitled "Porous Silicon Carbide."
g) U.S. 2010-0071328 of Boussant-Roux et al. entitled "Method For Making a SIC Based Ceramic Porous Body."

[2] S. Ding et al. "Effect of $Y_2O_3$ addition on the properties of reaction-bonded porous SiC ceramics" *Ceramics International* 2006, 32, 461-466.

[3] N. Al-Yassir and R. Le Van Mao "Thermal stability of alumina aerogel doped with yttrium oxide, used as a catalyst support for the thermocatalytic cracking (TCC) process: An investigation of its textural and structural properties" *Applied Catalysis A: General* 2007, 317, 275-283.

[4] M. K. Naskar and M. Chatterjee "A novel process for the synthesis of cordierite ($Mg_2Al_4Si_5O_{18}$) powders from rice husk ash and other sources of silica and their comparative study" *Journal of the European Ceramic Society* 2004, 24, 3499-3508.

[5] S. Zhanga et al. "Preparation and corrosion resistance studies of nanometric solgel-based $CeO_2$ film with a chromium-free pretreatment on AZ91D magnesium alloy" *Electrochimica Acta* 2010, 55, 870-877.

[6] "Alumina Sol Preparation from Alkoxides" *Ceramic Bulletin* 1975, vol. 54, No. 3, pp. 289-290).

A. Kaiser et al. "Uniaxial hydraulic pressing as shaping technology for advanced ceramic products of larger size" *Interceram* 2011, 03-04, 230-234.

The invention claimed is:

1. A method for the fabrication of porous SiC ceramic, comprising the steps of:
   (a) heating SiC particles in an oxidizing atmosphere to produce amorphous $SiO_2$ on the surface of the particles;
   (b1) coating the particles obtained in step (a) with one or more additives, at least one additive being in sol form;
   (c1) mixing the coated particles obtained in step (b1) with one or more types of monomer material and allowing the monomer material to undergo in-situ polymerization, to obtain particles coated with a polymer or pore-former;
   (d) forming a green body with the coated particles obtained in step (c1); and
   (e) heating the green body to yield the porous SiC ceramic, wherein, during step (e), the one or more additives at step (b1) react with the SiC particles obtained at step (a) to form an oxide coating.

2. The method according to claim 1, wherein the additive is selected from the group consisting of $Al_2O_3$ (alumina), $CeO_2$, $Y_2O_3$, MgO, and mixtures thereof.

3. The method according to claim 1, wherein step (a) is performed at a temperature of about 800-1350° C.

4. The method according to claim 1, wherein step (a) is performed by oxidation technique, during a period of about 3-9 hours.

5. The method according to claim 1, wherein step (b1) is performed by sol-gel technique.

6. The method according to claim 1, wherein step (c1) comprises using a Zeigler-Natta catalyst such as $TiCl_4$, optionally with a co-catalyst which is triethylaluminum.

7. The method according to claim 1, wherein step (c1) is performed at a temperature of about 50-69° C.

8. The method according to claim 1, wherein a drying step is performed after step (c1), prior to performing step (d), at a temperature of about 50-90° C.

9. The method according to claim 1, wherein the monomer material comprises ethylene, propylene or methyl methacrylate.

10. The method according to claim 1, wherein the polymer is polyethylene, polypropylene or poly(methyl methacrylate).

11. The method according to claim 1, wherein the polymer or pore-former in the green body represents about 10-30% of the volume of SiC ceramic.

12. The method according to claim 1, wherein at least one other additive is in a form selected from the group consisting of powder form and sub-micro powder form.

13. The method of claim 1, wherein step (d) comprises submitting the coated particles obtained in step (c1) to pressing, extrusion, casting, injection moulding or a combination thereof.

14. A method for the fabrication of porous SiC ceramic, comprising the steps of:
(a) heating SiC particles in an oxidizing atmosphere to produce amorphous $SiO_2$ on the surface of the particles;
(b1) coating the particles obtained in step (a) with one or more additives, at least one additive being in sol form;
(c1) mixing the particles obtained in step (b1) with a polymer or pore-former;
(d) forming a green body with the coated particles obtained in step (c1); and
(e) heating the green body to yield the porous SiC ceramic, wherein, during step (e(, the one or more additives at step (b1) react with the SiC particles obtained at step (a) to form an oxide coating.

15. The method according to claim 14, wherein, in step (c1), the polymer or pore-former is in dry powder form, and is selected from the group consisting of graphite, yeast, polymethyl methacrylate (PMMA), starch, jute, flax, cellulose and lignin fibers.

16. The method according to claim 14, wherein step (b1) comprises (i) treating the particles obtained in step (a) with $NH_4OH$, (ii) mixing the treated particles with the additive in sol form, (iii) optionally repeating steps (i) and (ii).

17. The method according to claim 14, wherein the additive is selected from the group consisting of $Al_2O_3$ (alumina), $CeO_2$, $Y_2O_3$, MgO, and mixtures thereof.

18. The method according to claim 14, wherein at least one other additive is in a form selected from the group consisting of powder form and sub-micro powder form.

19. The method of claim 14, wherein the additive is $Al_2O_3$ in sol form and the polymer or pore-former is graphite.

20. A method for the fabrication of porous SiC ceramic, comprising the steps of:
(a) heating SiC particles an oxidizing atmosphere to produce amorphous $SiO_2$ on the surface of the particles;
(b1) mixing the particles obtained in step (a) with at least one additive to obtain coated particles;
(c1) mixing the coated particles obtained in step (b1) with one or more types of monomer material and allowing the monomer material to undergo in-situ polymerization, to obtain particles coated with a polymer or pore-former;
(d) forming a green body with the coated particles obtained in step (c1); and
(e) heating the green body to yield the porous SiC ceramic, wherein, during step (e), the one or more additives at step (b1) react with the SiC particles obtained at step (a) to form an oxide coating.

* * * * *